(12) United States Patent
Dax

(10) Patent No.: US 8,925,713 B2
(45) Date of Patent: Jan. 6, 2015

(54) METHOD FOR OPERATING A PROCESSING SYSTEM, IN WHICH PRODUCT UNITS HAVING DIFFERENT PRODUCT CHARACTERISTICS ARE PROCESSED

(75) Inventor: Roman Dax, Baretswil (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 13/878,844

(22) PCT Filed: Oct. 3, 2011

(86) PCT No.: PCT/CH2011/000232
§ 371 (c)(1),
(2), (4) Date: Jun. 6, 2013

(87) PCT Pub. No.: WO2012/048435
PCT Pub. Date: Apr. 19, 2012

(65) Prior Publication Data
US 2013/0264170 A1    Oct. 10, 2013

(30) Foreign Application Priority Data
Oct. 15, 2010  (CH) ........................ 1693/10

(51) Int. Cl.
| | |
|---|---|
| *B65H 39/02* | (2006.01) |
| *B65G 47/26* | (2006.01) |
| *B65H 43/00* | (2006.01) |
| *B65H 43/02* | (2006.01) |
| *B42C 19/08* | (2006.01) |
| *G05B 19/418* | (2006.01) |
| *B65H 33/12* | (2006.01) |
| *B42C 1/12* | (2006.01) |

(52) U.S. Cl.
CPC ................ *B65G 47/26* (2013.01); *B65H 39/02* (2013.01); *B65H 43/00* (2013.01); *B65H 43/02* (2013.01); *B42C 19/08* (2013.01); *G05B 19/418* (2013.01); *B65H 33/12* (2013.01); *B42C 1/12* (2013.01); *B65H 2301/4311* (2013.01); *B65H 2301/435* (2013.01); *B65H 2511/10* (2013.01); *B65H 2511/20* (2013.01)
USPC ...................... 198/644; 198/418.7; 198/459.1; 270/52.16; 270/52.19

(58) Field of Classification Search
USPC .......... 198/418.5, 418.7, 419.2, 459.1, 459.8, 198/644; 270/52.14, 52.16, 52.19, 58.23
See application file for complete search history.

(56) References Cited

U.S. PATENT DOCUMENTS

| | | |
|---|---|---|
| 4,168,828 A | 9/1979 | McLear |
| 5,809,893 A | 9/1998 | Gamperling et al. |

(Continued)

FOREIGN PATENT DOCUMENTS

| | | |
|---|---|---|
| DE | 8717500 | 1/1989 |
| DE | 19917656 | 10/2000 |

(Continued)

*Primary Examiner* — Mark A Deuble
(74) *Attorney, Agent, or Firm* — Rankin, Hill & Clark LLP

(57) ABSTRACT

A method for operating a processing system, in which product units of different formats are processed. The processing system contains a plurality of processing devices that are arranged one after the other in a processing line. In the event of a format changeover, certain component arrangements arranged in the processing system must be adapted to the new product format. In the event of an upcoming format change, a gap in the conveyed goods is generated while the conveying operation is maintained, wherein the gap in the conveyed goods runs through the processing system along the processing devices. As soon as the gap in the conveyed goods runs through a component arrangement to be adapted to the new format, the format is changed over at the component arrangement while the gap in the conveyed goods runs through the component arrangement.

20 Claims, 4 Drawing Sheets

(56) References Cited

U.S. PATENT DOCUMENTS 6,311,968 B1 * 11/2001 Linder et al. ............... 270/52.25
8,056,892 B2 * 11/2011 Honegger .................. 270/58.23
8,419,004 B2 * 4/2013 Stauber ..................... 270/52.14

FOREIGN PATENT DOCUMENTS

| DE | 102008034065 | | 2/2010 | |
| DE | 102008033184 | | 3/2010 | |
| EP | 2107023 | A1 * | 10/2009 | ........... B65H 39/140 |

* cited by examiner

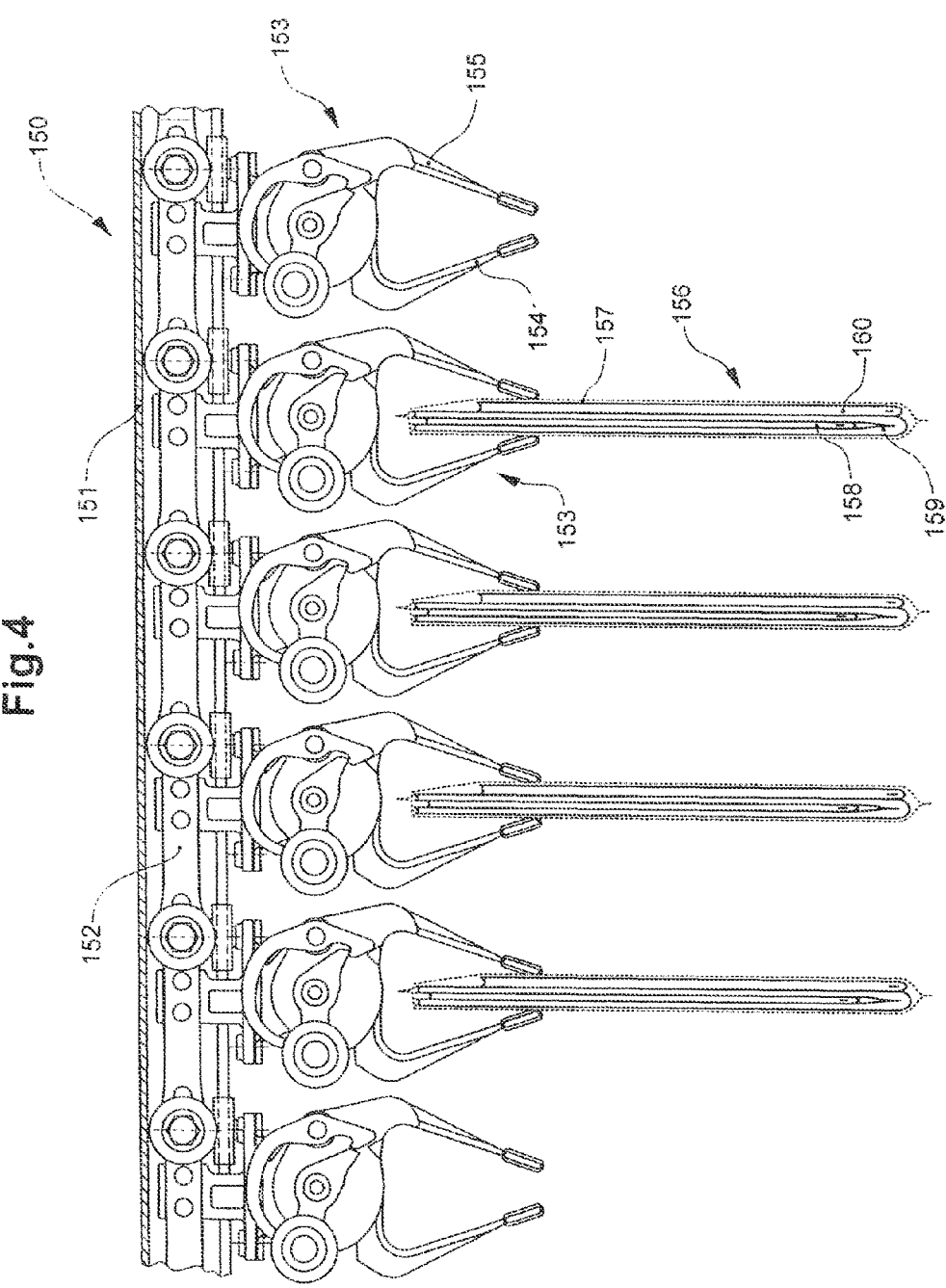

METHOD FOR OPERATING A PROCESSING SYSTEM, IN WHICH PRODUCT UNITS HAVING DIFFERENT PRODUCT CHARACTERISTICS ARE PROCESSED

BACKGROUND OF THE INVENTION

1. Field of the Invention

The invention relates to a method for operating a processing installation, in which product units with different product characteristics are processed, comprising at least one processing installation, as well as conveying means for conveying the product units in the processing installation, further comprising a control device for the control of the at least one processing device, and adjustment means for the adaptation of at least one influencing variable for influencing of the product units at the at least one processing device, to the different product characteristics.

The invention moreover relates to a processing installation for processing product units with different product characteristics, comprising at least one processing device, as well as conveying means for conveying the product units in the processing installation, further comprising a control device for the control of the at least one processing device, and adjustment means for the adaptation of at least one influencing variable for influencing the product units at the at least one processing device, to the different product units.

2. Description of Related Art

It is known to operate a processing device, in which products of a different format are collated at a collation device into a product collection which then as a product unit is conveyed through the processing installation and is fed to further processing steps. The product collections after their creation are fed in a cycled conveying operation to a packaging device where they are wrapped into a packaging film and are subsequently welded in and singularized. The packaged product collections are subsequently conveyed further to a delivery device. The product collections in the delivery device are put together into stacks and are bound into a stacking unit for the further transport.

The products, from which such collections are formed, each have different formats depending on the batch to be processed, so that the product collections of a batch can also each have different maximal formats. A product collection e.g. comprises one or more printed products, in the field of printed media. Whereas one product collection is addressed to a particular receiver, e.g. to an end customer or to a retailer, a batch of product collections of the same format corresponds to a geographic zone, within which a group of receivers of the same product collections is localised. In each case, product collections of the same contents are compiled for the receivers of individual regions, i.e. zones, since printed productions are targeted regionally with regard to the contents contained therein. These contents and thus also the format of the product collections can be different for other zones, so that a format changeover (resetting) can be necessary with a so-called zone change. One can even envisage the product collections being personalized and each product collection having its own format depending on the collection compiled for the individual addressees.

Different component arrangements in the processing devices, such as lateral aligning elements, the feeder device for the packaging material web or the seam creation and separation unit of the packaging device however must be set in each case to the format of the product collections. If then, subsequently to a batch of product collections of a first format, one changes over to a batch of product collections of a second format, then corresponding, format-dependent component arrangements in the processing devices must be reset manually prior to this. This according to today's state of the art, means that the processing installation must be shut down after completion of the preceding batch, and stopped for the manual format changeover for reasons of safety. The format settings at the related component arrangements of the shut-down processing installation are carried out manually by way of suitably technically trained personnel. After completion of the format changeover, the processing installation is run up again and the processing of the subsequent batch of product collections of the new format is resumed.

With the high processing speeds, which are common today, the stoppage of the processing installation means a significant reduction of the processing performance. A large time window, in which the installation is unproductive, is opened due to the shutting-down, taking out of operation and running-up, of the installation. If moreover, the format resetting or changeover at the related component arrangements is not immediately and swiftly carried out by the personnel, or if too few technically qualified personnel are available for the changeover, then the changeover process takes up even more time. Moreover, one must consider the fact that for safety reasons, the installation can only be run up when the last changeover has been carried out. This is also the case if the changeover has already been affected upstream and product units of the subsequent batch could already be processed, at least in the upstream processing region of the installation.

BRIEF SUMMARY OF THE INVENTION

It is therefore the object of the invention to provide a method as well as a processing installation of the initially mentioned type, which overcomes the above mentioned disadvantages, on the one hand by way of the unproductive time inherent of the changeover in the processing device being reduced and on the other hand by way of the changeover in the processing device being effected with as little as possible manual intervention, so that accordingly costly working time of technically trained personnel can be saved.

This object is achieved by the features of method claim 1 and of the device claim 14. Further preferred embodiments as well as further developments of the invention are to be deduced from the dependent patent claims. Features of the method claims, with regard to context, can be combined with the device claims and vice versa. The term "processing installation" or "processing device" according to definition are also to be understood as installations or devices, in which products or product units are manufactured, processed (further), worked on, treated or changed in another manner with regard to their structure or spatial alignment and are conveyed through the installation or device. Moreover, installations or devices which only comprise a conveying are also to fall under the definition. Likewise, the term "processing" according to definition is also to include the manufacture, treatment, working, (further) processing or also only a conveying of the products or product units through the installation or device.

The adjustment means for the adaptation to the new product characteristics are thus activated via the control device, wherein the at least one influencing variable is adjusted given a change from product units with current product characteristics to subsequent product units with subsequent product characteristics, whilst maintaining the conveying operation. For this, in particular the following steps are carried out:

feeding or compiling a last product unit with current or old product characteristics into and in the processing installation respectively;

feeding or compiling a first product unit with subsequent or new product units into and in the processing installation respectively;

producing a gap in the conveyed products after the last product unit with current product characteristics, amid the continuation of the conveying operation;

moving the gap in the conveyed products through the processing devices along the processing line;

adapting the influencing variable of at least one processing device to the subsequent product characteristics via the adjustment means, with a continued conveying operation, wherein the adjustment means for adapting the at least one influencing variable to the subsequent product characteristics is controlled via the control device in a manner such that this adaptation is effected when the gap in the conveyed products passes that region in the processing device, in which the influencing variable has an influence on the passing product units.

The gap in the conveyed products is usefully produced between a last product unit with current or old product characteristics and a first product unit with subsequent or new product characteristics.

"Old product characteristics" are the product characteristics of product units of a first batch, which e.g. are processed before the changeover of the influencing variable, whereas "new product characteristics" are the product characteristics of a second batch which are processed after a changeover of the influencing variable. The old and new product characteristics are accordingly different.

The processing installation contains preferably several processing devices, which are arranged one after the other in a processing line. The conveying means are preferably assigned to the processing devices. The product units can be conveyed in a product stream along the processing lines through the processing installation in a cycled or non-cycled manner. The product units are preferably conveyed through the processing installation in a cycled manner.

With regard to the influencing variable for influencing the product units, it is preferably the case of the geometry of a component arrangement in the processing device. Such a geometry and the associated component arrangement can for example be side guiding elements and their position relative to a conveying member or to the product units, a welding bar and its position relative to a conveying member or to the product units, feeder means for the packaging film and their position relative to a conveying member, or aligning elements for aligning product units and their position relative to one another or to the product units. The changeover or adjustment of the geometry of a component arrangement can e.g. be the change of the position of one component relative to another component. The position can e.g. be defined by a distance, and angle or an inclination. The changeover of the influencing variable or of the geometry of a component arrangement can also mean the exchange or the putting into operation or taking out of operation or connection or disconnection, of functionally effective components, modules, subassemblies, devices or stations. Thus, this can e.g. also relate to the connection or disconnection of a feeder station.

The adaptation of an influencing variable can also mean a change of the action of a component, in particular of a tool, on the product units. Thus e.g. welding parameters, such as welling temperature and welding duration, for welding a packaged product unit, can be dependent on the product characteristics. Moreover, variables such as the strength of an electrical field, the speed with which a tool, e.g. a welding bar is moved, the temperature for processing/treatment of a product, a prestressing force, e.g. of the packaging film, the strength of compressed air, the strength of blown air, vacuum or excess pressure, can be influencing variables which are dependent on product characteristics. Moreover, the selection of the applied packaging material with different characteristics, e.g. packaging material of a different thickness or tear strength, in dependence on the product characteristics such as size and weight of the product unit, can also be such an influencing variable.

The term "conveyed products" in the context of "gap in the conveyed products" here is related to the product units. The expression "whilst maintaining the conveying operation" means that the conveying means such as belt conveyors or gripper conveyors, etc., which are assigned to the individual processing device or connect these to one another, remain in movement, wherein product units are not necessarily conveyed. The conveying members of the conveying means, which are provided with product units or are empty, are thus kept in movement in the conveying operation. One can envisage the conveying speed of the processing installation being reduced during the passage of a gap in the conveyed products, for the purpose mentioned above or during the changeover, and being increased again after completion of the changeover. However, one can also envisage the initial conveying speed being retained or increased during the changeover.

The term "gap in the conveyed products" relates to a gap in the product stream, in which gap no product units are conveyed. The beginning and end of the gap in the conveyed products are determined by the conveyed product units. The characteristics of the product units or of the products which are encompassed by these are accordingly preferably different before and after the gap in the conveyed products.

The conveying means of the processing devices thus remain in operation during the changeover or the passage of the gap in the conveyed products, through the processing installation. Further processing units which are not necessary for the purely conveying operation are however preferably stopped, in particular from a certain size of the gap in the conveyed products. These can be in the packaging device e.g. the device for feeding the packaging material web and the device for seam creation. Moreover, this can also be the addressing unit, the control device or the stack formation device and the binding station of the delivery device.

The product characteristics can for example be the dimension (length, width, height), also called the format with printed products, the shape, the weight, the material nature, the surface characteristics, the surface texture, the stiffness or the number and type of the products in the product unit. All the previously mentioned characteristics can render necessary certain setting at the processing devices. Accordingly, the changeover of at least one influencing variable, in particular the changeover of at least one component arrangement in the processing installation becomes necessary with a change of one or more of these characteristics. With products or product units that consist to the greater part of printed products, a format changeover in the processing devices is necessary for example given a change of format. The "product characteristics" can relates to a single or to a plurality of variables such as length, width, height, shape, weight etc., which make up the characteristics of a product or of a product unit.

Of course, the change of product characteristics can render necessary the changeover of several equal or different influencing variables, in a certain processing device or in several processing devices. Moreover, the change of different product characteristics can render necessary a changeover of different influencing variables.

In a preferred embodiment of the invention, with regard to the product characteristics, it is the case of characteristics that the products or product units already have or obtain at the entry or at the beginning of the processing installation. However, it can also be the case that the products or product units do not obtain certain product characteristics until in the processing installation, or the product characteristics are changed in the processing installation. This can e.g. be affected by way of the working or processing or treatment of products or product units (e.g. cutting of printed products, packaging of products, etc.). Such newly obtained product characteristics or changed product characteristics can of course also be relevant to influencing variables in subsequent processing devices of the processing installation and accordingly be incorporated into the method according to the invention.

Amongst other things, individual products of a certain dimension or of a certain format fall under the term "product units". The dimension or the format of the product unit, which is relevant to the installation, is defined by at least one size, such as width, length or height. It can also be the case that only one of these sizes is relevant to the installation. As a rule however, at least the length and the width and often yet the height of the product unit is relevant to the operation of the installation, in such an installation.

Moreover, the product units can also comprise collections of several products which are preferably applied onto one another and which amongst one another each have the same or different dimensions or formats. If the individual products of a collection each have different dimensions or formats, then the dimension or the format of the collection or of the product unit is defined in each case preferably by the maximal dimensions of the individual products or by the product with the largest dimension or the largest format. The product units can also be stacks of the same types of products.

The products or individual products of a collection are preferably two-dimensional products, in particular two-dimensional and flexible products. Particularly preferably, the products or at least one product of a collection are/is a printed product such as e.g. a newspaper, magazine, pamphlet, brochure or a book. Moreover, the products can also be advertising supplements, product samples, CDs, DVDs, gimmicks and likewise, which can be added e.g. to a main product which can be a printed product such as a newspaper or magazine. The product units are preferably conveyed individually and one after the other and preferably distanced to one another in the conveying direction, through the processing installation. In this case, the products are preferably conveyed in a cycled manner. The product stream as a result is monitored with regard to the cycle here. The product units however at least in sections can also be conveyed in an imbricate stream through the processing installation, and this is particularly the case if the product units are conveyed in a non-cycled manner.

The gap in the conveyed products corresponds to the empty conveying region between the last product unit with preceding product characteristics and the first product unit with new product characteristics. The gap in the conveyed products can e.g. be given by a time interval between the passing of the last and the first product unit and which is dependent on the conveying speed. The gap in the conveyed products can also be specified as a length measure between the last product unit with preceding product characteristics and the first product unit with subsequent product characteristics. Since the present product stream is led through the installation in a preferably cycled manner, the gap in the conveyed products however is preferably specified by the number of cycles. This number e.g. corresponds to the number of empty grippers of a gripper conveyor or to the number of empty receiving compartments of a collation device.

The gap in the conveyed products is preferably created by way of the non-feeding or non-compiling of at least one and preferably of several product units. The gap in the conveyed products can of course also be created by way of discharging at least one and preferably several product units out of the processing installation. For this, at least the last product unit of the preceding batch and/or at least the first product unit of the subsequent batch are discharged at a suitable location. The product feed does not need to be interrupted by way of this. This variant however is not preferred, since the discharge of product units entails a significantly increased effort. The gap in the conveyed products can however also be generated by way of a combination of non-feeding and non-compiling and discharging product units. Thus e.g. it is conceivable for a gap in the conveyed products which has become too small, to be yet increased at a later stage by way of discharging product units.

The control device sets the number of cycles of the gap in the conveyed products, in dependence on the required changeover time, e.g. format changeover time, to the new product characteristics of that influencing variable, in particular component arrangement, with which the most time is required for the changeover, and on the conveying speed. The gap in the conveyed products should be at least so large, that the time which the gap in the conveyed products requires for passing that region of the processing device, in which the influencing variable exerts an influence onto the passing product units, in particular for passing the component arrangement with the longest changeover time, is at least equal long or longer than the mentioned changeover time. The size of the gap in the conveyed products is preferably computed afresh for each changeover, since the changeover times turn out differently depending on the magnitude of the differences between the relevant product characteristics, e.g. format differences, between the preceding and the subsequent batch of product units. Of course, a gap in the conveyed products with a uniform size can be envisaged for all possible changeovers, wherein the size of the gap in the conveyed products is directed to the greatest possible changeover time of an influencing variable, e.g. of a component arrangement. In this case, no computations with regard to the size of the gap in the conveyed products need to be made. On the other hand, this however also leads to a loss of efficiency, since for many changeovers, the gap in the conveyed products is too large and thus the unproductive time which this entails is therefore unnecessarily increased.

The control device can comprise a central installation control as well as local control units that are assigned to the processing devices or to the adjustment means. The installation control as well as the control units each preferably comprises or comprise an electronic data processing unit with a microprocessor and data memory.

Beforehand, the respective product characteristics, such as formats, of the product units or of the products of a product unit, which are to be processed, are transferred to the control device, e.g. to the installation control, for carrying out the method. The product characteristics can e.g. be detected manually via a detection unit and led to the control device. E.g., a measurement of the individual products or of the product unit itself can precede the manual detection. If the control device e.g. is fed with the formats of the individual products of a product unit, then this control device or an electronic data processing unit assigned to it determines the format of the product unit. One can also envisage the format or other characteristics of the product unit or of the associated individual products being determined in a device which is prior to the processing installation or in a device of the processing installation itself, in a fully automatic manner, e.g. via optical detection means. This can be affected in a feeder device or collation device of the processing installation.

On the basis of the product characteristics, such as formats, of the product units, said characteristics being fed in or determined by itself, the control device now generates control data that is transferred to the individual processing devices, in particular to control units in the processing devices. This relates to those processing devices, in which a changeover is to be carried out.

The adjustment means in the processing devices comprise e.g. actuators such as servomotors, for the mechanical adjustment of the geometry of the related component arrangement. The activation of the adjustment means can be effected in different manners.

The processing installation preferably comprises a central installation control which is superordinate to the processing devices and which is designed to process control data for adapting the at least one influencing variable, in particular the geometry of a component arrangement, to the characteristics of the product unit to be processed and of the at least one processing device. The installation control for this is preferably also designed to produce the gap in the conveyed products, for the purpose of the changeover to the new product characteristics.

According to a first embodiment variant, a central installation control produces control data with information on the product characteristics in the form of command variables that as control signals are fed directly into the adjustment means for activating the actuators. I.e. the adjustment means are activated directly via a central installation control. In this case, the central installation control from the data on the product characteristics, computes corresponding command variables for the adjustment means of the individual influencing variables or component arrangements. Moreover, the point in time of the changeover of the influencing variables or of the individual component arrangements, of the processing devices, and thus the point in time of the activation are determined by the central installation control.

However, one can also envisage the processing devices or the associated adjustment means having their own local control unit, via which the adjustment means or their actuators are activated. In this case, a central installation control transfers control data with information on the product characteristics, to the decentralised control units. The central installation control for this can compute the respective command variables for the adjustment means and transfer these to the associated, local control units. One can also envisage the central installation control only transferring the raw data for computing the command variables, such as e.g. the format values of the product units, to the local control units, which compute corresponding command variables for the adjustment means therefrom.

The activation of a feed device or a collation device and/or a discharge device for the purpose of the production of a gap in the conveyed products is effected via the control device, which is preferably the central installation control. The mentioned control device in particular also computes the necessary size of the gap in the conveyed products or the necessary time requirement for the changeover to the new product characteristics and, from this, the size of the gap in the conveyed products in dependence on the conveying speed. The time requirement for the changeover is different, depending on how large the differences of the mentioned product characteristics between the two product units are. The control device for this computes the number of cycles of a gap in the conveyed products. The number of cycles hereby corresponds to the number of non-feed or non-compiled product units. Any occurring change, in particular reduction, of the conveying speed during the changeover is likewise carried out by the control device, in particular by the central installation control. Moreover, also the point in time of the passage of the gap in the conveyed products through the regions, in which the individual influence variables have an influence on the product unit, in particular through the component arrangements of the processing devices, is determined by the central installation control and transferred for example to the local control unit for the activation of the adjustment means. One can also envisage the central installation control directly activating the adjustment means for this. Moreover, one can also envisage the central installation control transferring suitable time and/or position information on the gap in the conveyed products to the local control units, from which information these compute the corresponding point in time of activation for initiating the changeover at the corresponding regions or component arrangements.

In a further development of the invention, one can envisage a central installation control transferring control data with information on the product characteristics, to local control units. The local control units from this data determine the changeover times for the influencing variables or components arrangement, which are assigned to these times, said influencing variables or component arrangements able to be dependent e.g. on the magnitude of the respective difference between the product characteristics, or the magnitude of the "format jump". The local control devices communicate the determined changeover time to the central installation control, which from this determines the size of the gap in the conveyed products in dependence on the conveying speed.

In a particularly preferred embodiment of the method according to the invention, one envisages a central installation control giving a data package along the conveying path to each individual conveying cycle and accordingly to the conveying member assigned to this conveying cycle, as well as to the product unit conveyed with the conveying member. The data package is thus assigned to a certain cycle in a fixed manner and is preferably also transferred in a cycled manner. For this, preferably a digital cycle picture of the processing installation is created in the installation control. Now a data package, amongst other things with the characteristics of the product units conveyed with this cycle, is assigned to each cycle of this cycle picture. The data package for example comprises information as to whether the cycle carried along a product at all, as well as information on the product characteristics of the individual products of a product unit or of the product unit itself. This can e.g. be the dimension (length, width, height) or the format, the shape, the weight, the material nature, the surface characteristics, the surface texture, the stiffness, the quality, the product condition, possible damage, the number of products in the product unit or the address, to which the product unit is to be delivered. The data package moves together with the product unit or with the associated cycle, through the processing installation and, as also the product units, passes the different processing devices. The data package is e.g. led through the processing installation e.g. simultaneously with the cycle. The processing devices, or control units assigned to these, now on account of the carried-along data packages can call up product characteristics of the currently conveyed product units and apply them for control technological tasks.

Within the framework of the present invention, data packages are likewise now assigned to the individual cycles of the gaps in the conveyed products. These data packages amongst other things contain information on the characteristics of the product units which are conveyed through the processing installation directly subsequent to the gap in the conveyed products. If now, a gap in the conveyed products moves through the processing installation, then the processing devices in good time, specifically e.g. with the arrival of the gap in the conveyed products, receive the necessary information for implementing the changeover to the new product characteristics of the subsequent product units, such as e.g. product format, in the processing device, from the data packages which e.g. are led simultaneously or synchronously with the cycle, through the processing installation. In this manner, e.g. the central installation control does not have to communicate directly with the local control units. Specifically, it is the information in the data packages that leads to the changeover of influencing variables or the geometry of the mentioned component arrangements, for the purpose of adapting to the new product characteristics.

As a rule, tolerance values are provided for characteristic variables, in particular for component arrangements whose geometry is dependent on product characteristics. No changeover to the new format is required if the change of the product characteristics moves within this tolerance limit. The deviations in this case are e.g. accommodated by the design of the component arrangements themselves. For this reason, in a further development of the invention, suitable comparison and evaluation means are preferably provided, by way of which the product characteristics such as the format, or the individual sizes such as length, width or height which determine the product characteristics or the format, of a preceding batch of a product unit, are compared to the product characteristics, or to the format or to the individual sizes determining the format, of the subsequent batch of product units. No changeover is carried out if the differences or the differences between the individual sizes then lie within a tolerance range. If the differences lie outside the tolerance range, then a changeover is initiated. If e.g. a format has several sizes, such as length, width and height, then format adaptations can also be carried out only for individual sizes lying outside the tolerance region.

The invention also relates to a processing installation for processing product units with different product characteristics, containing several processing devices which are arranged one after the other in a processing line, as well as conveying means assigned to the processing devices, for the cycled or non-cycled conveying of the product units in a product stream along a processing line, further comprising a control device for the control of the processing installation, and comprising adjustment means for adapting the influencing variables, in particular the geometry of at least one component arrangement, of at least one processing device, to the different product characteristics, in particular for carrying out the method according to the invention.

The control device amongst other things serves for the activation of the adjustment means during the continued conveying operation for the purpose of adaptation to change product characteristics. The control device is designed in a manner such that the influencing variable of the geometry of the at least one component arrangement can be set to the subsequent product characteristics whilst maintaining the conveying operation, with a change of current product characteristics e.g. from a current product format, to subsequent product characteristics, e.g. to a subsequent product format.

The processing installation can e.g. comprise a first processing device which is designed as a feeder device and via which the product units are fed into the processing installation. The feeder device can e.g. be designed as a collation device, in which product collections or product stacks of individual products fed via suitable feeder units are created. The collation device e.g. comprises a plurality of feeder stations, which in each case feed a product of a certain category. Moreover, the collation device comprises a conveying unit arranged along the feeder stations and with conveying compartments that can be led past the feeder stations, in a conveying path. The conveying compartments in each case form a support surface for receiving the products and for forming the product units (e.g. collections or stacks). One possible embodiment of such a collation device is described e.g. in the publication documents WO 2008/058 405, EP 2 107 023 and WO 2010/051651. The construction and the functioning principle of such an already known collation device are therefore not described in any more detail at this location. Rather, the subject-matter disclosed in the mentioned documents, in particular the object defined in the preamble of the independent claims is herewith to be part of the disclosure.

The processing installation can moreover comprise a further processing device which is designed as a packaging device and in which the product units fed in the product stream are packaged. The packaging device can e.g. comprise a device for individually packaging product units with a packaging material web fed in a quasi endless manner, as has been described e.g. in the publication document WO2005/118400. The packaging device preferably comprises conveying means for conveying the product units lying on a conveying support, such as a conveyor or conveyor belt, and further comprises a feeder unit for feeding the flexible packaging material web, and a connection creation and separation unit for closing the packaging wrapping arranged around the product units and for separating the packaged product units from one another. The connection creation unit in particular is designed for creating packaging seams, such as weld seams. The construction and the functioning principle of such an already known packaging device are therefore not described in any more detail at this location. Rather, the subject-matter disclosed in the mentioned publication document, in particular the object defined in the preamble of the independent claims, is herewith to be part of the disclosure.

Furthermore, the processing installation can also comprise a processing device designed as a delivery device, in which the preferably packaged product units fed in the product stream are put together and are prepared for transport away. The product collections or the groups of product units are put together into larger package units such as stacks and prepared for the further transportation, in the delivery device. The package units can e.g. be bound or packaged in a different manner, for the secure further transport. Several such larger package units can in turn be put together on pallets and palleted into even larger package units. The delivery device preferably comprises a stacking station for forming stacks of product units. Moreover, the delivery device preferably also comprises a binding station for binding the stacks.

According to a particularly preferred embodiment of the invention, the processing installation seen in the conveying direction or processing direction comprises: a collation device; a packaging device connecting indirectly or directly to the collation device; and a delivery device connecting indirectly or directly to the packaging device.

The installation can be changed over to new product characteristics, such as e.g. to a new format, in conveying operation and in a fully automatic manner without having to stop the installation for the changeover, thanks to the method according to the invention and to the further development of the processing installation, according to the invention. The conveying of the product units is merely interrupted in the region of the gap in the conveyed products. Since the length of the gap in the conveyed products and thus the length of the conveying interruption are also matched to the time necessary for the changeover and accordingly optimised, this corresponds to the shortest possible interruption for a changeover to new product characteristics.

A further advantage lies in the fact that on resuming the product processing, one does not have to wait until the last changeover in the processing installation, as was the case previously. The product processing specifically, according to the invention, can already be resumed in those installation sections which lie upstream and which the gap in the conveyed products has already passed, and this being before the changeover is already completed in the installation sections lying downstream.

The productivity of the processing installations can thus be significantly increased thanks to the present invention. The more changeovers or format changes occur, or the smaller are the product batches defined by certain product characteristics, or by a certain format, the greater is the increase in efficiency. Since today's printed products, or the collections which are compiled from these have to be designed in an increasingly customer-specific manner, the performance limit of such processing installations is very quickly reached with the changeovers or format changes which this entails. The performance of the processing installation is increased with the device according to the invention, as well as the associated method, without particular and costly capacity extensions having to be carried out on existing installations, or old installations having to be replaced by new installations or additional new installations having to the purchased. The present invention has the further advantage that existing installations can be retrofitted with very little effort for carrying out the method according to the invention.

The subject manner of the present invention is not to be restricted only to processing installations in the field of printed products, but is applied in all fields in which piece goods are led in a piece product stream, in particular in a cycled piece product stream, through a processing installation. This e.g. includes the field of foodstuff processing, letter and parcel distribution, and generally the field of logistics.

BRIEF DESCRIPTION OF THE DRAWINGS

The subject matter of the invention is hereinafter explained in more detail by way of preferred embodiment examples that are represented in the accompanying drawings. There are shown schematically in each case:

FIG. 4 is an elevation view of a gripper conveyor shown in sections.

The reference numerals used in the drawings and their significance are listed in a grouped manner in the list of reference numerals. Basically, the same parts are provided with the same reference numerals in the figures.

DETAILED DESCRIPTION OF THE INVENTION

Figure 1:
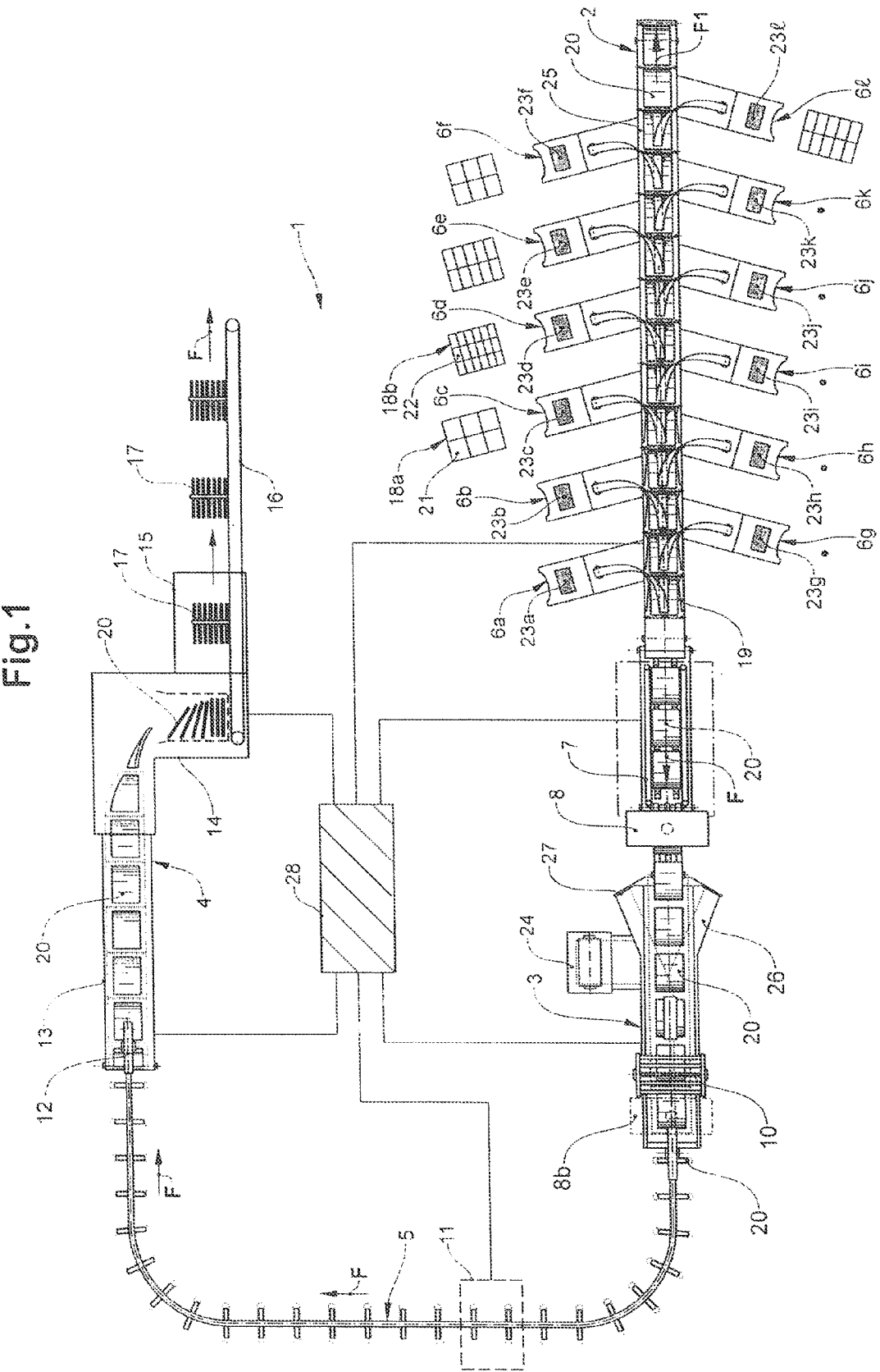
FIG. 1 is a plan view of a processing installation according to the invention.

The processing installation 1 shown in FIG. 1 serves for processing two-dimensional, flexible printed products. The installation 1 for this comprises a collation device 2 for collating the printed products into collections. The collation device comprises conveying means with a plurality of conveying compartments 25 which can be moved one after the other along a conveying path. The conveying compartments 25 are led past feeder units 6a-6k which here by way of example are arranged on both sides, and there are twelve of them. Individual products are transferred via the feeder units 6a-6h from a stack 23a-23h to the conveying compartments 25 which are led past these, for the purpose of creating a collection. The feeder units 6a-6h according to this embodiment are charged manually with products from pallets 18a-18b. For the sake of simplicity, not all pallets with products are represented. Each conveying compartment 25 comprises a support surface, on which the products 21, 22 fed by the feeder units 6a-6l are deposited and compiled into a collection 20. The collation device 2 moreover comprises a side aligning unit 19 with side alignment means arranged on both sides of the conveying compartments 25, for the lateral alignment of the products 22, 21 deposited on the conveying compartments 25. Of course, it is also possible to produce a sequence of individual products or stacks of equal products with the described device.

The conveying compartments 25 here are led in a closed circulatory path, wherein the conveying compartments 25 are transported in an upper path section in a first conveying direction F1 and charged with products 21, 22 from the feeder units. The conveying compartments 25 are led back in a second conveying direction F2 which is opposite to the first conveying direction F1, along a lower path section (not visible in FIG. 1, see FIG. 3a-f).

Seen in the processing direction, a packaging device 3 is subsequent to the collation device 2. The collections or product units 20 are transferred at the head end of the packaging device which faces the packaging device 3. A positioning device 7 for positioning and pacing the product units 20 is provided subsequently to the collation device 2, between the collation device 2 and the packaging device 3. In the positioning device 7, the product units 20 before entry into the packaging device 3 are aligned laterally and to one another at defined distances. The positioning device 7 can e.g. comprise a revolving cam belt with leading and/or trailing cams, wherein the product units 20 are aligned at the revolving cams.

An addressing unit 8 is further arranged between the positioning device 7 and the packaging device 3 or at the beginning of the packaging device 3. The addressing unit 8b can however also be arranged subsequently to or at the end of the packaging device 3. The addressing unit 8, 8b for this is designed as an exchangeable module which selectively can be coupled to the processing installation before or after or at the beginning or end of the packaging device 3. Of course the addressing module can also be part of the packaging device 3. The product units 20 in the addressing unit 8 are provided with an address which e.g. by way of suitable writing means is deposited directly onto an outer lying product, or which, deposited on a separate cover page or label, is fed to the product unit 20. If however the address is deposited onto the packaging wrapping or is glued to the packaging wrapping via a label, then the addressing unit can also be arranged subsequently to the packaging unit.

The product units 20 subsequently to the addressing unit 8, 8b are led in series one after the other and distanced to one another via suitable conveying means, into the packaging device 3, wherein these are wrapped with a quasi continuously fed packaging material web 26. The packaging device 3 for this comprises means 24 for feeding a packaging material web 26 as well as for conveying the packaging material web 26 together with the product units 20 conveyed in series on a conveying support. Moreover, the packaging device 3 comprises a device 27 for turning over the packaging material web and for the complete wrapping of the product units 20. Of course, several packaging material webs can also be fed, wherein in this case a device 27 for turning over the packaging material web 26 under certain circumstances is no longer necessary. In a subsequent connection creation and separating unit 10 of the packaging device 3, the packaging wrapping arranged around the product units 20 is closed via longitudinal and transverse connections which e.g. can be designed as seams, in particular as welding seams. Subsequently, the packaged product units 20 are separated from one another along the transverse connections. The packaging material web 26 is preferably a plastic film and the packaging seams are preferably welding seams.

After the packaged product units 20 have left the packaging device 3, these are fed to via an intermediate conveying device 5 which is designed as a gripper conveyor, to a delivery device 4. Moreover, a control device 11, at which the packaged product units 20 led past are tested with regard to their correct position and alignment in the gripper, is provided between the packaging device 3 and the delivery device 4, in the region of the intermediate conveying device 5.

On entry into the delivery device 4, the packaged product units 20 are transferred at a delivery station 12 from the gripper conveyor to a conveying surface 13, i.e. a conveyor belt, of the delivery device 4, on which these are fed in a row and individually one after the other to a stack formation device 14. The packaged product units 20 in the stack formation device 14 are put together into product stacks 17, and bound in a subsequent binding station 15 and subsequently prepared for the transport away. The thus formed product stacks 17 are transported away from the delivery device 4 via a conveying-away device 16.

The processing installation 1 comprises a central installation control 28, via which the individual processing devices and processing units, or their control units, can be activated by way of communication leads.

With a format change, now under certain circumstances, changeovers or resetting of component arrangements are necessary in: the side aligning unit 19, in which the position of the side aligning elements defined by the width of the product units must be set, the pacing unit 7, in which the position of the aligning cams defined by the length of the product units must be set, the device 27 for turning over the packaging material web, in which the turning-over procedure defined by the width and height of the product units must be set, the connection creation and separating device 10, in which the position of the longitudinal connection defined by the width of the product units, as well as the distances and the position of the transverse connections and of the separating locations which are defined by the length of the product units 20 must be set, the control device 11, in which the sensor setting which is dependent on the width and the length of the product units must be changed, and the stack formation device 14, in which e.g. the side guides for the stack formation must be changed.

The above mentioned listing is only exemplary. Further devices in the processing installation, such as control devices or stations in the delivery device, such as the stacking device or binding station can likewise be subjected to a format resetting or changeover.

Figure 2A:
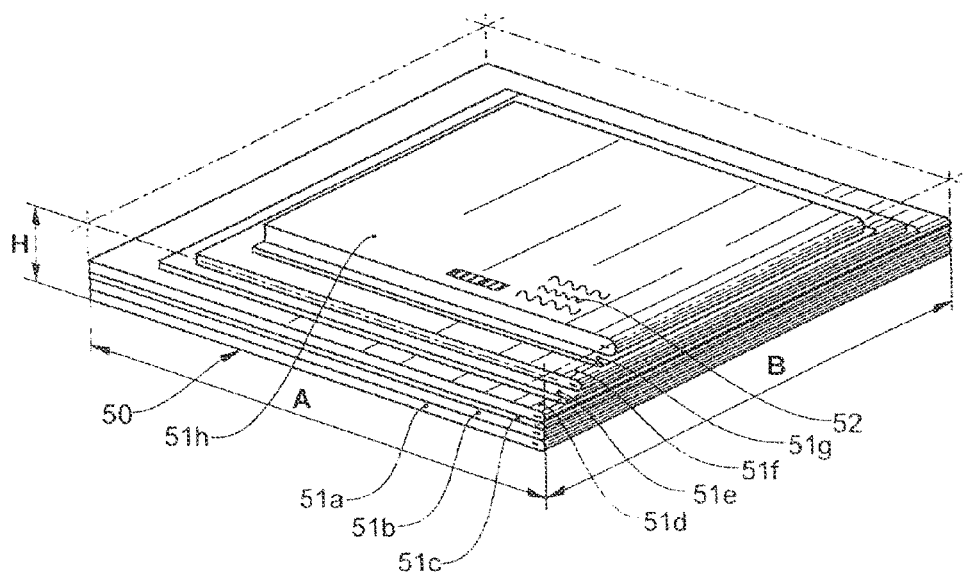
FIGS. 2a-2b are perspective views of a product unit compiled from individual products of a different format.
Figure 2B:
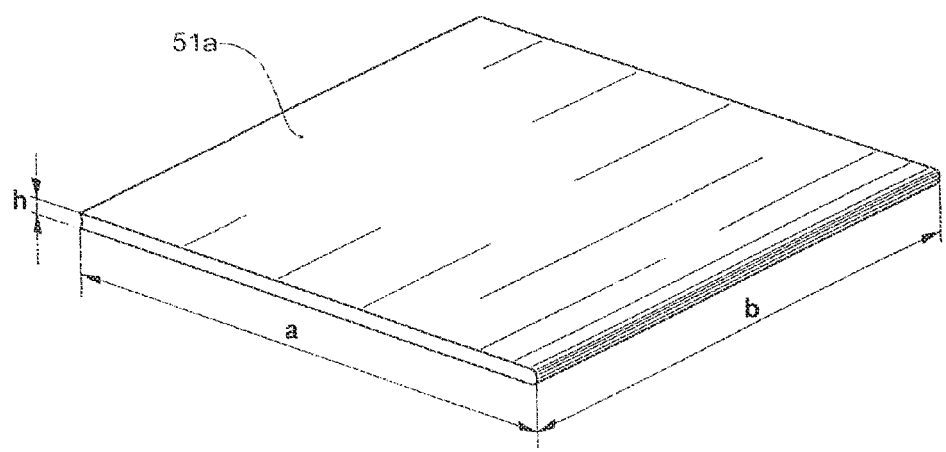
Figure 3A:
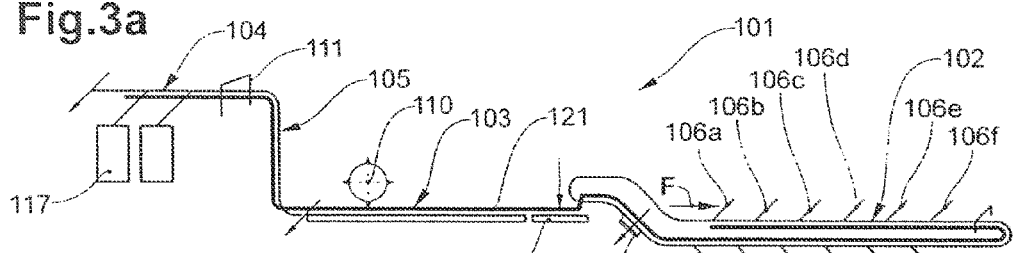
FIGS. 3a-3f are schematic representations of the gap in the conveyed products moving through a processing installation.
Figure 3B:
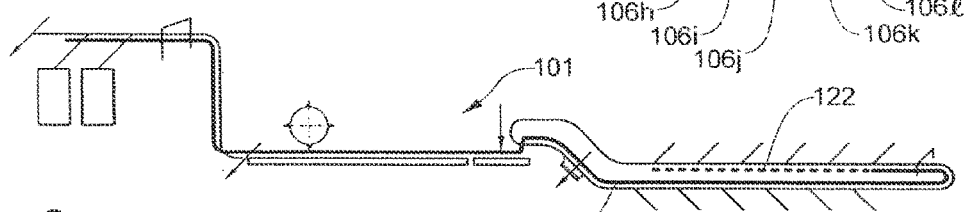
Figure 3C:
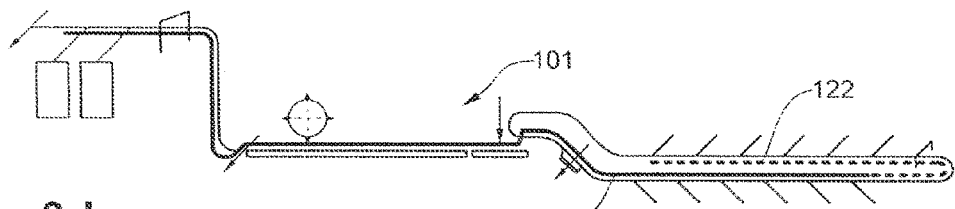
Figure 3D:
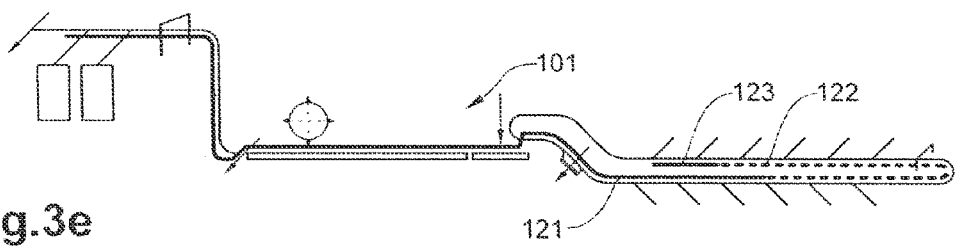
Figure 3E:
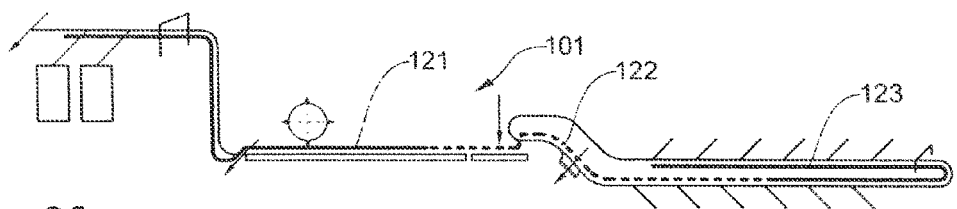
Figure 3F:
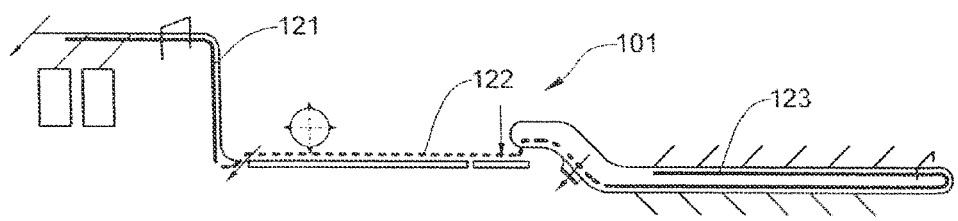

The product unit 50 according to FIG. 2a consist of a collection of for example eight printed products 51a-51h of a different format which lie on one another. The format of an individual product is defined by a length a, a width b and a height h. The format of the product unit 50 then with respect to its length A and width B is then defined by way of the product 51a (see FIG. 2b) with the greatest surface extension (length a, width b), as well as with respect to the height H by way of the total height of the products 51a-51h applied on one another. It can be the case that a first product has a maximal length a and a second product has a maximal width b (not shown). In this case, the format of the product unit 50 with respect to the length A and the width B is defined by way of the maximal length of the first product and the maximal width of the second product. An outer lying product 51h can carry the address 52 of the receiver or a barcode.

FIGS. 3a-3f show an extremely schematic representation of a processing installation 101 as is represented in a somewhat more specific manner in FIG. 1 for example. The focus of the representation in the FIGS. 3a-3f is on a gap in the conveyed products which moves through the processing installation. The individual processing devices of the installation 101 are therefore represented only very schematically. FIG. 1 is referred to with regard to further embodiments, which shows one possible embodiment of the processing installation shown in an abstract manner in these figures. The processing installation 101 shown in the FIGS. 3a-3f comprises a collation device 102 with a multitude of feeder units 106a-106l, a packaging device 103 arranged after the collation device 102 in the processing direction and with a connection creation and separating device 110, as well as a positioning device 107 lying between the collation device 102 and the packaging device 103. Moreover, the processing installation 101 comprises an intermediate conveying device 105 which is arranged after the packaging device 103 and which conveys the packaged product units to a delivery device 104. A stack formation device 114, in which stacks are created from product units, is arranged subsequently to the delivery device 104.

The collation device 102 moreover comprises a discharge station 120 (which moreover is also present in the collation device according to FIG. 1, but is not shown). If the gap 122 in the conveyed products has now become too small, then product units connecting directly subsequent or preceding the gap 122 in the conveyed products can yet be additionally discharged at the discharge station 120.

A gap 122 in the conveyed products, of several, e.g. 70 cycles is now produced in the collation device 102, for initiating a format changeover. This is affected by way of no products being fed from the feeder units and accordingly no product units being collated, over the corresponding number of cycles. If the gap in the conveyed products has reached its size which is necessary for the changeover of the related component arrangements, then the feeding of products from the feeder units is begun for the creation of product units of the new format. The gap 122 in the conveyed products now travels with the conveying speed through the processing installation 101. The format changeover is initiated as soon as the gap 122 in the conveyed products reaches a component arrangement, in which a format changeover must be carried out. For this, the time period which the gap in the conveyed products requires in order to pass through the related component arrangement, is available for the format changeover. By way of this, it is ensured that the geometry of the component arrangement or the position of the associated components is only changed in a phase, in which no product units are led past the component arrangement or the related components. After completion of the format changeovers, the gap in the conveyed products leaves the processing installation 101 via the delivery device 104. After the gap 122 in the conveyed products has left a component arrangement or a processing device, the processing of the product units of the new format which are subsequent to the gap 122 in the conveyed products, is resumed in this region of the installation.

Since the gap 122 in the conveyed products moves with a certain conveying speed through the processing installation 101 in a continuous manner, it is possible that the product units of the new format are already collated in the collation device 102, i.e. a product stream 123 of product units of the new format is generated, whilst in a component arrangement of a processing device which is arranged thereafter and which has just been passed by the gap in the conveyed products, the format changeover is still in process, and in a further component arrangement which is arranged after the first mentioned component arrangement and which the gap 122 in the conveyed products has not yet reached, the format changeover has not yet taken place or product units from the preceding product stream 121 of the old format are still being processed.

FIG. 4 shows a side view of a gripper conveyor 150 which is shown in a sectioned manner and which e.g. can be an intermediate conveying device 5, 105. The gripper conveyor 150 comprises a conveying chain 152 which is guided in a guide rail 151 and on which transport grippers 153 each with a first and a second gripping limb 154, 155 are arranged at regular distances. Each transport gripper 153 in each case corresponds to one cycle. Individual transport grippers 153 hold product units 156 which are filmed, i.e. packaged in a plastic packaging film 157, in a hanging position. The product units 156 are collections of individual products 158, 159, 169. With the present collection, a first product 158 is inserted into a second product 159 which for example is the main product. A third product 160 bears on the second product 159. All three products 158, 159, 160 of this collection have different characteristics, in particular formats.

The invention claimed is:

1. A method for the operation of a processing installation, in which product units with different product characteristics are processed, comprising at least one processing device, as well as conveying means for conveying the product units in the processing installation, further comprising a control device for the control of the at least one processing device, and an adjustment device for adapting at least one influencing variable for influencing the product units at the at least one processing device, to the different product characteristics, wherein a gap in the conveyed products is produced and is moved through the processing installation, wherein an adaptation of the at least one influencing variable to new product characteristics of a subsequent product unit is effected via the adjustment device with continued conveying operation, and wherein the adjustment device is controlled via the control device such that the adaptation of the at least one influencing variable is effected when the gap in the conveyed products passes that region in the processing device, in which the influencing variable exerts an influence on the passing product units.

2. The method according to claim 1, wherein the at least one influencing variable for influencing the product units is set to the product characteristics of a subsequent product unit amid the implementation of the following steps:

feeding a last product unit with old product characteristics into the processing installation or collating a last product unit with old product characteristics in the processing installation;

feeding a first product unit with new product characteristics into the processing installation or collating a first product unit with new product characteristics in the processing installation;

producing a gap in the conveyed products after the last product unit;

moving the gap in the conveyed products through the processing installation;

adapting the at least one influencing variable for influencing the product units, to the new product characteristics of the subsequent, first product unit via the adjustment device, with continued conveying operation, wherein the adjustment device controlled via the control device such that the adaptation is effected when the gap in the conveyed products passes that region in the processing device, in which the at least one influencing variable exerts an influence on the passing product units.

3. The method according to claim 1, wherein the gap in the conveyed products is created by way of the non-feeding or non-compiling at least one product unit and/or by way of discharging at least one product unit out of the processing installation.

4. The method according to claim 1, wherein the control device determines the size of the gap in the conveyed products in dependence on the conveying speed and the required changeover time of that influencing variable, with which most time is required for the changeover to the new product characteristics, so that the time for the passage of the gap in the conveyed products through the related region, in which this influencing variable exerts an influence on the product units, is at least as long or longer than the associated changeover time.

5. The method according to claim 1, wherein information on the product characteristics, in particular the formats of the products to be processed or the format of the product units, is transferred to the control device before the changeover.

6. The method according to claim 1, wherein the control device, on the basis of the transferred product characteristics, generates control data which is transferred to the at least one processing device, in particular to a control unit of the processing device, for the purpose of the changeover to the new product characteristics.

7. The method according to claim 1, wherein a central installation control assigns a data package to at least one cycle of the gap in the conveyed products and this data package is led with this cycle through the processing installation to a control unit of the at least one processing device, and the data package comprises control data or information, which is based on product characteristics, and the control unit uses the control data or information of the data package, for the changeover to the new product characteristics.

8. The method according to claim 1, wherein the control data or information correspond to the command variables for the adjustment means or to the output variables, such as e.g. to the characteristic variables of the product units or the products, for computing the command variables.

9. The method according to claim 1, wherein the product unit is a collection of different products of a different format, wherein the format of the collection is defined by its maximal width, maximal length and maximal height, and the format of the collection is either computed from the formats of the individual products or by way of measurement of the format sizes of the collection, or a combination thereof.

10. The method according to claim 1, wherein for at least characteristics variable, the difference value between the preceding and the subsequent product characteristics variable is determined and is compared to a tolerance range for this characteristic variable, wherein for this characteristic variable:

a. no changeover of the at least one influencing variable is carried out in the processing installation if the difference value lies within the tolerance range; and
b. a changeover of the at least one influencing value to the new product characteristics is carried out in the processing installation if the difference value lies outside the tolerance range.

11. The method according to claim 1, wherein during the changeover of the at least one influencing variable to the new product characteristics, in the processing installation, the conveying speed is changed, in particular reduced, with respect to the nominal speed before and after the changeover.

12. The method according to claim 1, comprising the further steps of:
   collating product units from individual products, in a collation device;
   conveying the product units further to a packaging device and packaging the product units;
   conveying the packaged product units further and carrying out a quality control in a control device;
   conveying the controlled product units further to a delivery device and creating a package unit from several product units.

13. The method according to claim 1, wherein the influencing variable for influencing the product units corresponds to the geometry of a component arrangement in the processing device, and the adjustment device is controlled via the control device such that the adaptation of the geometry of the component arrangement is effected during the passage of the gap in the conveyed products through the related component arrangement.

14. A processing installation for processing product units with different product characteristics, comprising at least one processing device as well as conveying means for conveying the product units in the processing installation, further comprising a control device for the control of the at least one processing device, and adjustment means for adapting at least one influencing variable for influencing the product units at the at least one processing device, to the different product characteristics, for carrying out the method according to claim 1, wherein:

the control device is designed for activating the adjustment device for the purpose of adapting the at least one influencing variable to new product characteristics, and that the design of the control device is such that the at least one influencing variable can be adjusted with a change from previous product characteristics to new product characteristics, while maintaining conveying operation.

15. The processing installation according to claim 14, wherein the processing installation comprises an installation control that is superordinate to the at least one processing device and that is designed to process control data for adapting the at least one influencing variable to the product characteristics and transferring it to the at least one processing device.

16. The processing installation according to claim 14, wherein the processing installation comprises an installation control that is superordinate to the at least one processing device and that is designed to produce a gap in the conveyed products which can be led through the processing installation, for the purpose of the changeover of at least one influencing variable at a processing device, to new product characteristics.

17. The processing installation according to claim 14, wherein the processing installation comprises a feeder device, into which product units are fed or in which product units are compiled.

18. The processing installation according to claim 17, wherein the feeder device is a collation device, in which product units in the form of collections of individual, fed products can be created.

19. The processing installation according to claim 14, wherein the processing installation comprises a packaging device, in which the individual product units are packaged.

20. The processing installation according to claim 14, wherein the processing installation comprises a delivery device, in which the product units, which are preferably packaged in a packaging device, are put together into package units, in particular stacks and are prepared for the away-transport.

* * * * *